UNITED STATES PATENT OFFICE.

ANTON GRUND, OF MERRILL, WISCONSIN.

LUBRICANT.

SPECIFICATION forming part of Letters Patent No. 449,849, dated April 7, 1891.

Application filed January 15, 1891. Serial No. 377,911. (No specimens.)

*To all whom it may concern:*

Be it known that I, ANTON GRUND, a citizen of the United States, residing at Merrill, in the county of Lincoln and State of Wisconsin, have invented certain new and useful Improvements in Lubricants; and I do declare the following to be a full, clear, and exact description of the invention, such as will enable others skilled in the art to which it appertains to make and use the same.

My invention has relation to improvements in compositions of matter to be used as lubricants; and it consists of the following ingredients, combined in the proportions stated, viz: linseed-oil, three parts; lard, one part; pitch, one part.

In carrying out my invention the pitch is first heated to a suitable consistence, when the linseed-oil and lard are added, and the mixture boiled together for about ten minutes, when it is cooled and is then ready for use. The lubricant thus produced is employed in the ordinary manner upon axles, journal-bearings, and all other parts of machinery needing lubricantion, although it is designed more particularly for use as an axle-lubricant, being of a consistence best suited for that purpose.

The mixture of the ingredients before stated affords a smooth and efficient lubricant containing no deteriorating substance that might injure the bearings to which the lubricant is applied.

Having described my invention, what I claim is—

The herein-described composition of matter to be used as a lubricant, consisting of linseed-oil, lard, and pitch in the proportions specified.

In testimony whereof I affix my signature in presence of two witnesses.

ANTON GRUND.

Witnesses:
 JOHN VAN HECKE,
 ELISHA L. BUMP.